(12) United States Patent
Strobel et al.

(10) Patent No.: US 10,886,968 B2
(45) Date of Patent: Jan. 5, 2021

(54) TIMESHARING FOR LOW POWER MODES

(71) Applicant: Lantiq Beteiligungs-GmbH & Co. KG, Neubiberg (DE)

(72) Inventors: Rainer Strobel, Munich (DE); Lilia Smaoui, Munich (DE); Vladimir Oksman, Morganville, NJ (US)

(73) Assignee: Lantiq Beteiligungs-GmbH & Co. KG, Neubiberg (DE)

( * ) Notice: Subject to any disclaimer, the term of this patent is extended or adjusted under 35 U.S.C. 154(b) by 0 days.

(21) Appl. No.: 15/902,638

(22) Filed: Feb. 22, 2018

(65) Prior Publication Data

US 2018/0183493 A1 Jun. 28, 2018

Related U.S. Application Data

(63) Continuation of application No. 14/888,714, filed as application No. PCT/EP2014/059135 on May 5, 2014, now Pat. No. 9,948,352.

(60) Provisional application No. 61/819,579, filed on May 5, 2013, provisional application No. 61/819,580, filed on May 5, 2013.

(51) Int. Cl.
| | |
|---|---|
| *H04B 3/32* | (2006.01) |
| *H04W 72/04* | (2009.01) |
| *H04M 11/06* | (2006.01) |
| *H04L 5/14* | (2006.01) |
| *H04W 76/28* | (2018.01) |

(52) U.S. Cl.
CPC .................. *H04B 3/32* (2013.01); *H04L 5/14* (2013.01); *H04M 11/062* (2013.01); *H04W 72/0446* (2013.01); *H04W 76/28* (2018.02); *H05K 999/99* (2013.01); *Y02D 30/00* (2018.01); *Y02D 30/50* (2020.08)

(58) Field of Classification Search
CPC ........ H04B 3/32; H04W 72/04; H04W 76/28; H04M 11/06; H04L 5/14
See application file for complete search history.

(56) References Cited

U.S. PATENT DOCUMENTS

| | | |
|---|---|---|
| 5,495,483 A | 2/1996 | Grube et al. |
| 5,521,906 A | 5/1996 | Grubs et al. |
| 8,295,151 B2 | 10/2012 | Dortschy et al. |
| 8,306,097 B2 | 11/2012 | De Lind Van Wijngaarden et al. |

(Continued)

FOREIGN PATENT DOCUMENTS

| | | |
|---|---|---|
| CN | 1805421 A | 7/2006 |
| CN | 1889551 A | 1/2007 |

(Continued)

OTHER PUBLICATIONS

Notice of Allowance dated Dec. 5, 2017 for U.S. Appl. No. 14/888,714.

(Continued)

*Primary Examiner* — Jamal Javaid
*Assistant Examiner* — Thad N Defauw
(74) *Attorney, Agent, or Firm* — 2SPL Patent Attorneys PartG mbB; Yong Beom Hwang

(57) ABSTRACT

Techniques for implementing timesharing in discontinuous systems, for example to implement low power modes, are discussed. In some embodiments, a set of bit loading tables is determined in advance, and bit loading tables are then selected based on which lines are transmitting and which are quiet.

23 Claims, 11 Drawing Sheets

(56) References Cited

U.S. PATENT DOCUMENTS

| | | | |
|---|---|---|---|
| 8,498,294 | B1 | 7/2013 | Monk et al. |
| 8,824,265 | B2 | 9/2014 | Maes et al. |
| 8,854,943 | B2 | 10/2014 | Goodson et al. |
| 9,048,925 | B2 | 6/2015 | Zirwas |
| 9,356,654 | B2 | 5/2016 | Starr et al. |
| 9,503,185 | B2 | 11/2016 | Joffe et al. |
| 2003/0063564 | A1 | 4/2003 | Ha |
| 2004/0095921 | A1 | 5/2004 | Kerpez |
| 2004/0171359 | A1 | 9/2004 | Tirkkonen et al. |
| 2005/0003794 | A1 | 1/2005 | Liu |
| 2005/0114904 | A1 | 5/2005 | Monk et al. |
| 2005/0271129 | A1 | 12/2005 | Reina |
| 2006/0046658 | A1 | 3/2006 | Cruz et al. |
| 2007/0002599 | A1 | 1/2007 | Caven |
| 2008/0069193 | A1 | 3/2008 | Shridhar et al. |
| 2008/0123725 | A1 | 5/2008 | J |
| 2008/0298444 | A1* | 12/2008 | Cioffi .................. H04M 11/062 375/222 |
| 2009/0193109 | A1 | 7/2009 | Kuo |
| 2009/0296864 | A1* | 12/2009 | Lindoff ................ H04B 17/336 375/357 |
| 2010/0043031 | A1 | 2/2010 | Wang |
| 2010/0278328 | A1 | 11/2010 | Mahadevan et al. |
| 2010/0312552 | A1 | 12/2010 | Zheng |
| 2011/0142111 | A1 | 6/2011 | Sands et al. |
| 2012/0008525 | A1 | 1/2012 | Koskinen |
| 2012/0026926 | A1* | 2/2012 | Frenzel ................ H04L 5/0046 370/311 |
| 2012/0027979 | A1 | 2/2012 | Kurokawa et al. |
| 2012/0039373 | A1 | 2/2012 | Cuzzola et al. |
| 2012/0182886 | A1 | 7/2012 | Ong |
| 2012/0250491 | A1 | 10/2012 | Goodson |
| 2012/0287979 | A1 | 11/2012 | Garrett et al. |
| 2012/0324262 | A1 | 12/2012 | Chang et al. |
| 2013/0028202 | A1* | 1/2013 | Hofmann .............. H04W 28/06 370/329 |
| 2013/0208587 | A1 | 8/2013 | Bala |
| 2016/0072532 | A1 | 3/2016 | Girlie et al. |
| 2016/0073448 | A1 | 3/2016 | Strobel et al. |
| 2016/0087677 | A1 | 3/2016 | Strobel et al. |

FOREIGN PATENT DOCUMENTS

| | | |
|---|---|---|
| EP | 2391031 A1 | 11/2011 |
| WO | 2012/076598 A1 | 6/2012 |
| WO | 2012/102917 A1 | 8/2012 |

OTHER PUBLICATIONS

Non-Final Office Action dated May 9, 2017 for U.S. Appl. No. 14/888,714.
Associate Rapporteur for G.fast "G.fast: Updated Issues List for G.fast: TD2013-03-Q4-U20R1" ITU-T Draft; Study Period 2013-2016, International Telecommunication Union; Geneva, CH, vol. 4/15; Mar. 22, 2013, pp. 1-42.
Adtran, Inc. "G.fast: Extension of STDMA and STDD", ITU-T Draft; Study Period 2009-2012, International Telecommunication Union, Geneva, CH, vol. 4/15, Feb. 22, 2012, pp. 1-9, XP017579706.
International Search Report and Written Opinion of PCT/EP2014/059135.
International Search Report and Written Opinion of PCT/EP2014/059134.
Associate Rapporteur for G.fast: "G.fast: Updated Issues List for G.fast: TD2013-05-Q4-U20", ITU-T Draft; Study Period 2013-2016, International Telecommunication Union, Geneva, CH, vol. 4/15, Apr. 11, 2013, pp. 1-42, XP01758044.
Ex Parte Quayle Office Action dated Apr. 14, 2017 for U.S. Appl. No. 14/888,713.
Non-Final Office Action dated Aug. 2, 2016 for U.S. Appl. No. 14/888,713.
Notice of Allowance dated Feb. 22, 2018 for U.S. Appl. No. 14/888,713.
Non-Final Office Action dated Apr. 24, 2019 for U.S. Appl. No. 15/981,173.
"Series G: Transmission Systems and Media, Digital Systems and Networks Digital sections and digital line system—Access networks." Self-FEXT cancellation (vectoring) for use with VDSL2 transceivers. ITU-T Telecommunication Standardization Sector of ITU. G993.5 (Apr. 2010). 80 pages.
Non-Final Office Action dated May 9, 2019 for U.S. Appl. No. 16/131,488.
Notice of Allowance dated Dec. 13, 2019 in connection with U.S. Appl. No. 16/131,488.
Final Office Action dated Oct. 1, 2019 for U.S. Appl. No. 16/131,488.
Extended European Search Report dated Sep. 30, 2019 for European Application 19189805.5.
"G.fast: Updated Issues List for G.fast," Source: Associate Rapporteur for G.fast. ITU-Telecommunication Standardization Sector. Study Group 15. Hoffman Estates, Illinois May 13-17, 2013. Question: 4/15. Temporary Document 2013-05-Q4-U20. 42 pages.
"G.fast: Extension of STDMA and STDD." Source: ADTRAN Inc. ITU-Telecommunication Standarization Sector. Study Group 15. Paris, France, Feb. 27-Mar. 3, 2012, Question: 4/15. 2012-02-4A-061. 9 pages.
Non Final Office Action dated Jan. 14, 2020 in connection with U.S. Appl. No. 15/902,638.

* cited by examiner

TIMESHARING FOR LOW POWER MODES

CROSS-REFERENCE TO RELATED APPLICATION

This application is a continuation application of U.S. application Ser. No. 14/888,714 filed on Nov. 3, 2015, which claims priority to PCT/EP2014/059135 having an international application date of May 5, 2014, which application claims priority of U.S. Application Ser. No. 61/819,579, filed May 5, 2013, entitled, "Low Power Modes for Data Transmission From a Distribution Point" and U.S. Application Ser. No. 61/819,580 filed May 5, 2013, entitled, "Timesharing for Low Power Modes". The entire disclosure of the prior applications is considered part of the disclosure of this application and is hereby incorporated by reference.

FIELD

The present application relates to timesharing for low power modes in communication systems.

BACKGROUND

Recent trends in the access communications market show that data rates up to 100 Mb/s which are provided by VDSL systems using Vectoring as defined in ITU-T Recommendation g.993.5 are not sufficient and bit rates up to 1.0 Gb/s are required for some applications. This can currently only be achieved in a wire-based system if copper pairs connecting customer premises equipment (CPE) as short as 50-100 m. Operation using so short loops requires installation of many small street/MDU (multi dwelling unit) cabinets called Distribution Points (DP) that intends to serve a very small number of customers, e. g. 16 or 24 and is connected to the backbone via fiber (fiber to the distribution point FTTdp).

Vectoring may be used in systems operating from a DP to reduce far-end crosstalk (FEXT), which is absolutely necessary to obtain high bit rates. To improve energy efficiency and to reduce hardware complexity, synchronized time division duplexing (S-TDD) is used for FTTdp.

DPs shall allow very flexible installation practices: they should be light and easy to install on a pole or house wall, or basement, without air-conditioning. The most challenging issue for these flexible connection plans is providing DPs with power. The only solution found is so-called "reverse feeding" when the equipment of the DP is fed by the connected customer. The requirement of reverse power feeding and the small size of the DP implies substantial restrictions on the power consumption of the DP.

Therefore, reducing the power consumption of DPs would be desirable.

Discontinuous operation has been proposed to save power in FTTdp communication. However, discontinuous operation adds some complexity to a line joining process and reduces the achievable bit rates.

Reducing peak bit rates on the other hand means that the transmission time to provide a given data rate increases, and this reduces the power savings.

Maintaining stability, bit error rates and transmit power constraints when lines sharing one cable binder discontinue transmission may result in performance degradation in conventional approaches.

DETAILED DESCRIPTION

Embodiments will be described in the following in detail with reference to the attached drawings. It should be noted that these embodiments serve as illustrative examples only and are not to be construed as limiting. For example, while embodiments may be described having numerous details, features or elements, in other embodiments some of these details, features or elements may be omitted and/or may be replaced by alternative features or elements. In other embodiments, additionally or alternatively further features, details or elements apart from the ones explicitly described may be provided.

Communication connections discussed in the following may be direct connections or indirect connections, i.e. connections with or without additional intervening elements, as long as the general function of the connection, for example to transmit a certain kind of signal, is preserved. Connections may be wireless connections or wire-based connections unless noted otherwise.

In some embodiments, timesharing is used in a low power mode, which in some embodiments may overcome issues caused by discontinuous operation.

In some embodiments, the timesharing is used in a vectored system. In some embodiments, mechanisms for joining of lines to a vectored group may be provided.

In some embodiments, timesharing low power modes are provided.

Some embodiments may comprise using different bit loading and gain tables for different sets of disabled lines.

Some embodiments may comprise increasing bitrates of active lines when other lines are in low power mode.

Some embodiments may comprise maximizing data rates for each configuration to shorten transmit times.

Some embodiments may comprise selecting transmit times of different configurations to minimize power consumption for specific target rates.

Some embodiments may comprise recomputing transmit times to adapt to actual rates lower than target rates.

Some embodiments may comprise recomputing transmit times to adapt to peak rates higher than target rates.

In some embodiments, low power mode joining sequences are provided.

Some embodiments may comprise predicting rates for different configurations based on simplified estimation and run optimization over them.

Some embodiments may comprise identifying a set of active configurations and calculate gains and bit loadings for active configurations.

Some embodiments may comprise using timesharing to separate joining configuration and active configurations in time.

In some embodiments, a timesharing protocol is provided.

In some embodiments, the protocol may comprise a TDD frame update command.

In some embodiments, the protocol may comprise configuration update commands.

In some embodiments, the protocol may comprise a per configuration link quality management.

Figure 1:
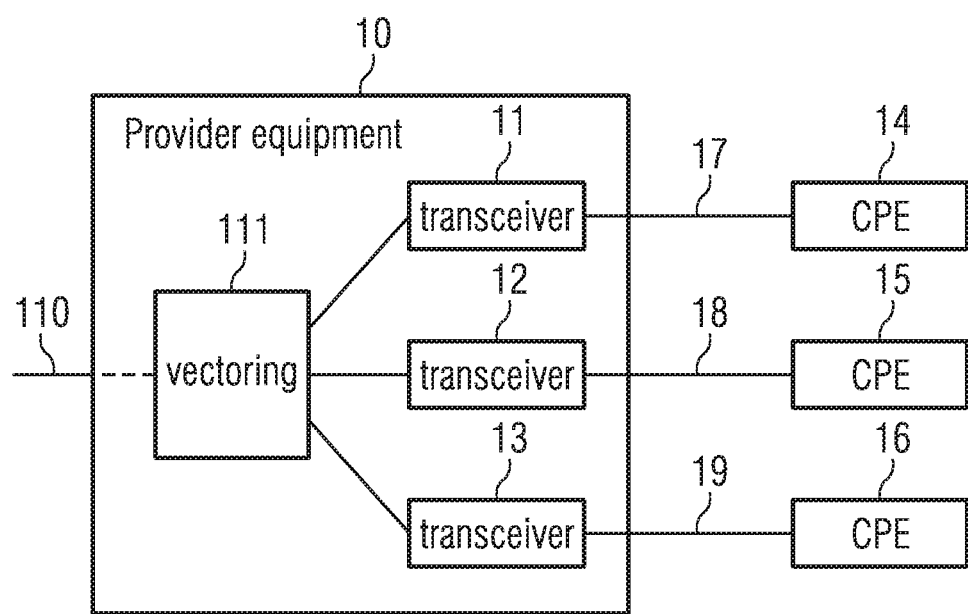
FIG. 1 illustrates a communication system according to an embodiment.

Turning now to the figures, in FIG. 1 a communication system according to an embodiment is shown. The system of FIG. 1 comprises a provider equipment 10 communicating with a plurality of CPE units 14-16. While three CPE units 14-16 are shown in FIG. 1, this serves merely as an example, and any number of CPE units may be provided. Provider equipment 10 may be central office equipment, equipment in a distribution point (DP), or any other equipment used on a provider side. In case provider equipment 10 is part of a distribution point, it may for example receive and send data from and to a network via a fiber optic connection 110. In other embodiments, other kinds of connections may be used.

In the embodiment of FIG. 1, provider equipment 10 comprises a plurality of transceivers 11-13 to communicate with CPE units 14-16 via respective communication connections 17-19. Communication connections 17-19 may for example be copper lines, e.g. twisted pairs of copper lines. Communication via communication connections 17-19 may be a communication based on a multicarrier modulation like discrete multitone modulation (DMT) and/or orthogonal frequency division multiplexing (OFDM), for example an xDSL communication like ADSL, VDSL, VDSL2, G.Fast etc., i.e. a communication where data is modulated on a plurality of carriers, also referred to as tones. In some embodiments, the communication system may use vectoring, as indicated by a block 111 in FIG. 1. Vectoring comprises joint processing of signals to be sent and/or received to reduce crosstalk.

A communication direction from provider equipment 10 to CPE units 14-16 will also be referred to as downstream direction, and a communication direction from CPE units 14-16 will be also be referred to as upstream direction. Vectoring in the downstream direction is also referred to as crosstalk precompensation, whereas vectoring in the upstream direction is also referred to as crosstalk cancellation or equalization.

Provider equipment 10 and/or CPE units 14-16 may include further communication circuits (not shown) conventionally employed in communication systems, for example circuitry for modulating, bit loading, Fourier transformation etc.

In some embodiments, communication via communication connections 17-19 is a frame-based communication. A plurality of frames may form a superframe. In some embodiments, timesharing is used, as will be explained in the following in more detail.

Figure 2:
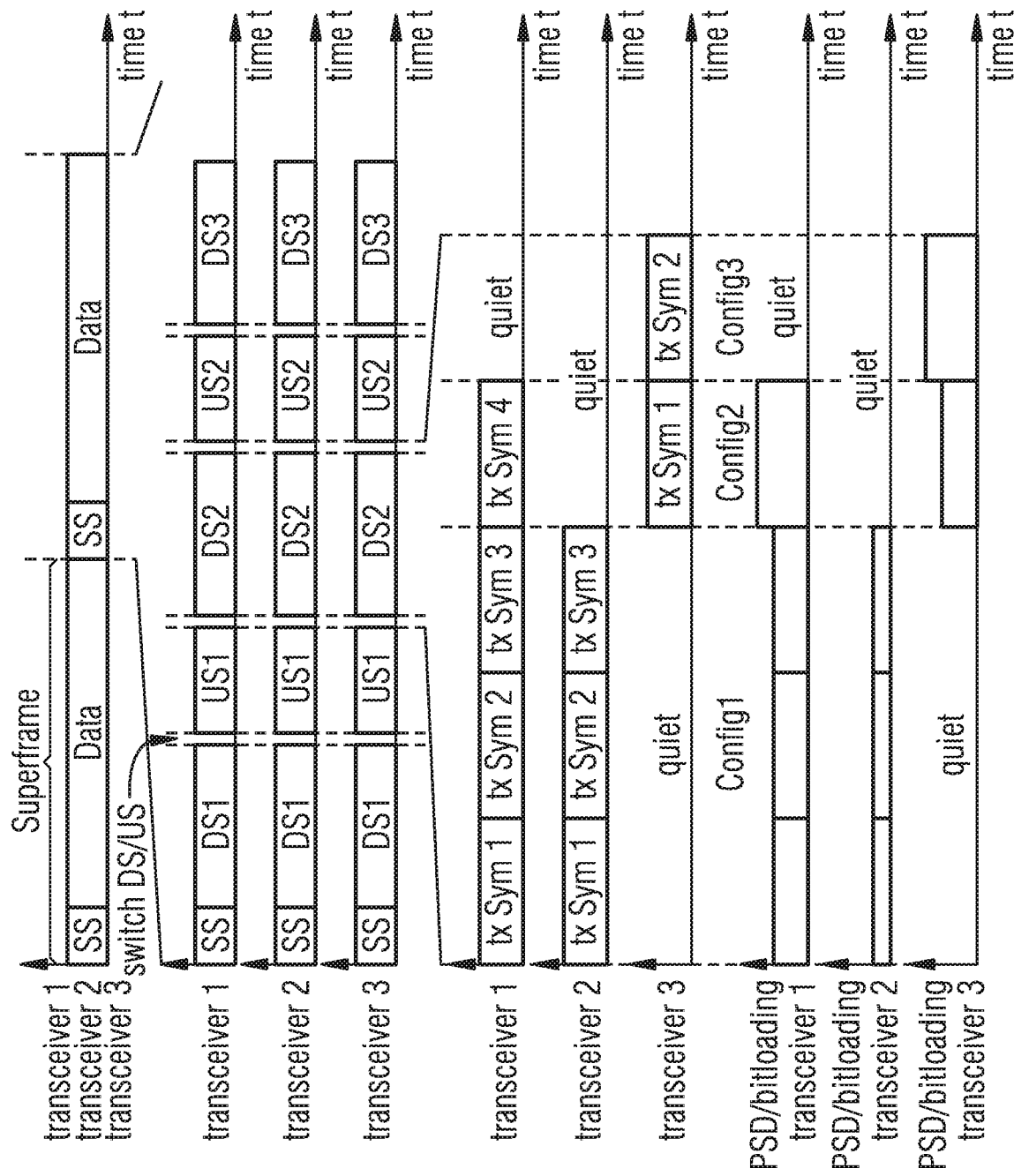
FIG. 2 illustrates a frame format for timesharing according to embodiments.

The idea of timesharing as applicable in some embodiments is shown in FIG. 2. Each superframe is split up into multiple sections which may use different configurations of enabled and disabled links and different bits and gains settings. Such an optimization method can be used to improve data rates in a transmission system, but it can also be used to reduce power consumption in combination with discontinuous operation in embodiments. Such bit and gain settings for example in DSL systems may be determined at startup and/or adapted during communication.

The number of different configurations per superframe is limited by the number of DMT frames or less than that, depending on the available memory and coefficient recalculation capabilities.

In embodiments, both, DP and CPE know in advance the timing information for the next symbols.

In embodiments, there is one base configuration for the case of all links active. Precoder and equalizer coefficients for crosstalk precompensation and crosstalk cancellation (also referred to as equalization), respectively are calculated for the base configuration. Sync symbols are transmitted using the base configuration and the channel is estimated using the base configuration in embodiments.

The schedule of a TDD (time division duplexing) frame is exchanged between the DP and the CPEs to inform transmit side about the symbols where data shall be transmitted and the rate to be used to transmit and to inform the receive side about the time when the data arrives and how to decode it.

The time sharing system in embodiments has one or more of the following properties:
Handling of multiple configurations of transmitter and receiver parameters.
Joint optimization of schedule of multiple transmitters.
The schedule is exchanged between transmitter and receiver.

The above-explained timesharing will now be used as a basis for implementing discontinuous operation for FTTdp applications according to some embodiments.

A property of timesharing is that is simplifies the construction of optimal schedulers for many different optimization problems such as rate optimization and power minimization. Furthermore, it simplifies the consideration of hardware limitations in the optimization.

In some conventional approaches, timesharing was used to maximize data rates. In some embodiments, a different optimization problem is solved. Instead of maximizing the data rates with respect to transmit power constraints, in embodiments the power consumption is minimized with respect to minimum data rates.

For each line i of a plurality of lines (e.g. communication connections 17-19 of FIG. 1), are target rate $R_{target\ i}$ is defined.

The system maintains multiple sets of bit loadings and scale factors (e.g. bit loading tables and gain tables), which are optimized for a specific set of active lines or a group of sets of active lines.

At each time instance, t, the link i achieves the data rate $R_{t\ i}$ and consumes the power $p_{t\ i}$.

The configuration of time instance t is used for a fraction $\alpha_t$ of the transmission time of a TDD frame.

For the time fractions $\alpha$ $$\sum_{t=1}^{T} \alpha_t = 1 \qquad (3.1)$$

holds. The fraction $\alpha$ may be selected with respect to the integer number of $N_{sym}$ symbols in a superframe to be $$\alpha = \frac{n}{N_{sym}}, N_{sym}, n \in IN.$$

We define the effective link data rate as follows:

$$R_i = \sum_{t=1}^{T} R_{ti} \cdot \alpha_t. \quad (3.2)$$

The average per-link transmit power $p_{link\ i}$ of link i is given by $$p_{linki} = \sum_{t=1}^{T} p_{ti} \cdot \alpha_t. \quad (3.3)$$

The aggregate transmit power $p_{config\ t}$ for each configuration t is given by $$p_{configt} = \sum_{i=1}^{L} p_{ti} \quad (3.4)$$

Then, there is an optimal configuration of transmit times for each subset of active lines which achieves the target data rates with minimum power consumption. To find it, the optimization problem $$\min_{\alpha_t t \in 1 \ldots T} \sum_{i=1}^{L} p_{linei} \text{ s.t. } R_i \geq R_{targeti} \forall\ i = 1 \ldots L \quad (3.5)$$

is solved in embodiments.

The maximum number of possible configurations for L ports is $2^L$, which is already a very high number for the target sizes of 8 or 16 ports. For the operation of the timesharing optimization, it is not necessary to search over all possible configurations. It is sufficient to optimize over some preselected configurations of interest.

They may be selected with respect to hardware constraints or according to the link qualities and line rates.

The number of different configurations that is contained in the solution will be less or equal to the number of lines L which is the number of different configurations to be stored. For each individual line, the number of stored configurations is even less because only configurations where the line transmits or receives data are stored.

In some applications, there may be a hard constraint on the power consumption of the DP and the CPE, for example if it runs on battery power.

Then, the optimization problem of Eq. (3.5) turns into $$\max_{\alpha_t t \in 1 \ldots T} \sum_{i=1}^{L} R_i \text{ s.t. } \sum_{i=1}^{L} p_{linei} \leq p_{limit}. \quad (3.6)$$

The solution is method is the same for both optimization problems, Eq. (3.5) and Eq. (3.6).

For the timesharing system an optimizer searches the best combination of a set of configurations.

In embodiments, the timesharing optimization for power minimization from Eq. (3.5) or Eq. (3.6) is reformulated as a linear program of the form $$\min_x c^T x \text{ s.t. } Ax = b, x \geq 0 \quad (3.7)$$

The vector x is the argument of the minimization and contains the timing information and the achieved data rates $$x = \begin{pmatrix} \alpha_1 \\ \ldots \\ \alpha_T \\ R_1 \\ \ldots \\ R_L \end{pmatrix}. \quad (3.8)$$

The vector c gives the weight vector for optimization. It contains the power consumption of each configuration according to Eq. 3.4.

$$c = \begin{pmatrix} p_{t1} \\ \ldots \\ p_{tT} \\ 0 \\ \ldots \\ 0 \end{pmatrix}. \quad (3.9)$$

The matrix A and the vector b are used to formulate the linear constraints on the minimum data rates according to Eq. (3.2) in the first L rows and the requirement that the sum of scale factors is equal to 1 as defined in Eq. (3.1) in the last row of A as defined in $$A = \begin{bmatrix} R_{11} & \ldots & R_{t1} & \ldots & R_{T1} & -1 & 0 & \ldots & 0 \\ R_{12} & \ldots & R_{t2} & \ldots & R_{T2} & 0 & -1 & \ldots & 0 \\ \ldots & \ldots & \ldots & \ldots & \ldots & \ldots & \ldots & \ldots & \ldots \\ R_{1L} & \ldots & R_{tL} & \ldots & R_{TL} & 0 & 0 & \ldots & -1 \\ 1 & \ldots & 1 & \ldots & 1 & 0 & 0 & \ldots & 0 \end{bmatrix} \quad (3.10)$$

and b as shown in $$b = \begin{pmatrix} R_{target1} \\ \ldots \\ R_{targetL} \\ 1 \end{pmatrix}. \quad (3.11)$$

The set of configurations $T=\{1 \ldots T\}$ does not need to contain all possible configurations as it is required for transparent operation. It may contain some preselected configurations which are most relevant.

The selection may also be limited by implementation constraints. But it must be noted that the set T that is used for the initial optimization can be selected to contain more possible configurations than the set $T_a$ of actually used configurations, which is exchanged between DP and the CPEs.

The matrix A as defined in Eq. (3.10) contains the achievable data rate for each link and each configuration of the set of configurations. To compute them, the scale matrix S, the noise power and the direct channel coefficients are required as shown in Eq. (1.13) and (1.14).

The calculation of the optimal scale matrices can be very time consuming. Therefore, approximations of the rate calculation may be applied here. One approximation is to use the scale factor calculation according to Eq. (1.12) instead of (1.18) for the full configuration set T. An additional approximation for multicarrier transmission such as DMT is to do the rate calculation only for a subset of carriers which is spread over the whole spectrum and interpolate the bit loading between them to predict the data rate.

Only for the reduced set of configurations $T_a$ which is contained in the solution of the optimization problem, the full spectrum optimization is done.

Based on the time required to solve the optimization problem, the number of configurations to be stored and other hardware limitations, different implementations of timesharing discontinuous operation according to various embodiments will now be discussed.

Figure 3:
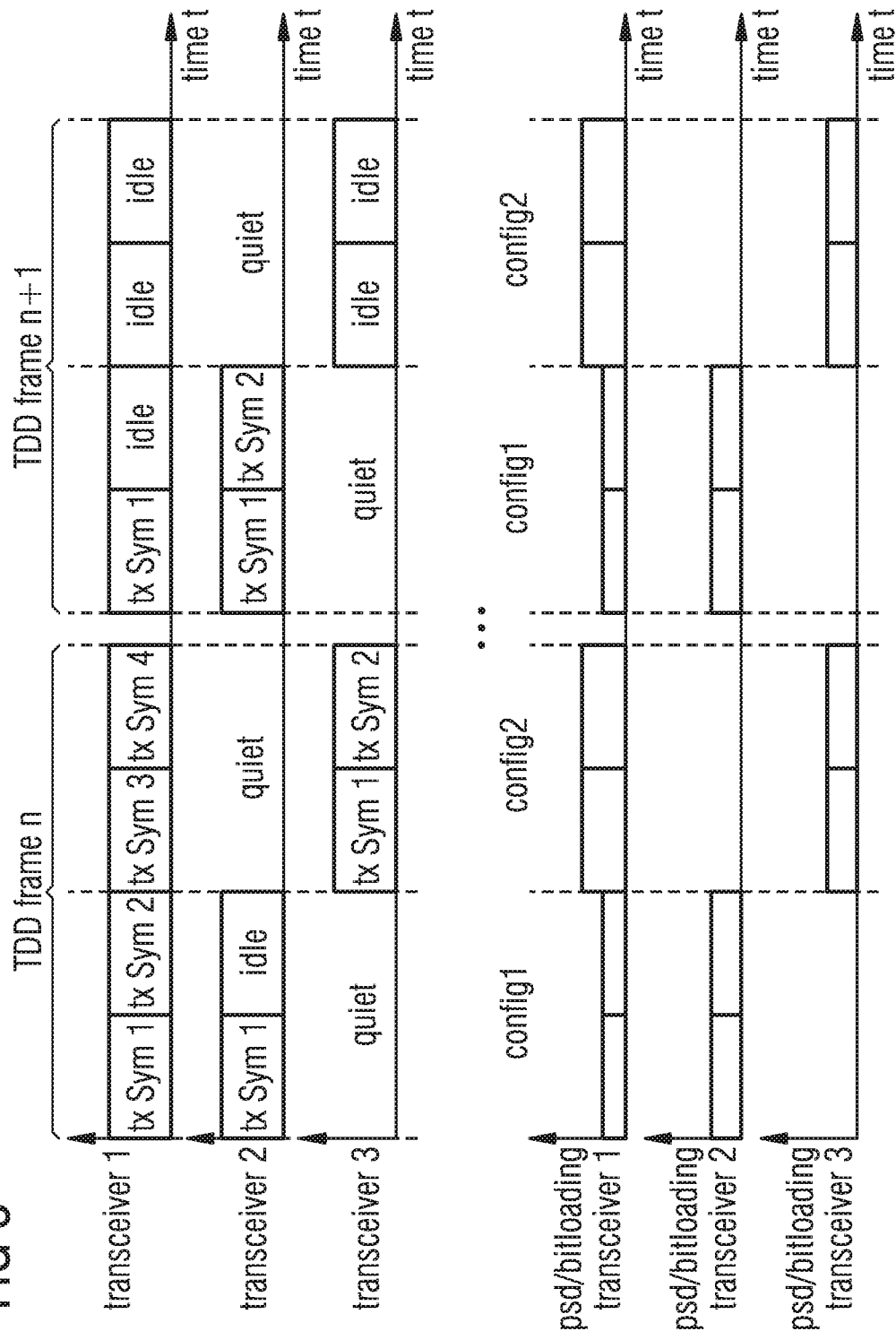
FIG. 3 illustrates an example for twotime division duplexing frames with discontinuous operation in a static mode.

A first implementation will be referred to as static operation. One possible application of timesharing power minimization is to calculate the frame format with respect to the maximum data rates of the users. The schedule is fixed regardless of the actual data rates. FIG. 3 shows the TDD frame format for such a static operation.

The static operation can be used to provide stable target data rates to multiple subscribers with reduced power consumption. However, in static operation it is not possible to serve higher peak data rates or to save power when links are not fully utilized.

If the actual data rate is less than the target rate, idle symbols are transmitted. They might be sent with zero power to reduce power consumption, but the frontend and line driver is then kept in active state to continue transmission of the correction signal for other lines.

Coefficient recalculation for vectoring is used to recompute the precoder and equalizer when some lines discontinue. This is done such that the equalizer for downlink does not change. The bit loading and gain tables are known to the CPE in advance as well as the scheduling. This information is stored at DP and at CPE side.

Reconfiguration of gains, bit loading and schedule is possible using an online reconfiguration message.

This can be improved by a more dynamic operation mode.

Another implementation will be referred to as quasi-dynamic operation. The above-described static operation does not take the actual link usage into account. It always uses the same configuration per TDD frame and fills up the symbols of each link with idle symbols when there is no more data to transmit. In practice, the actual link rates will be $R_{act\,i} < R_{target\,i}$ can be below the maximum available rates.

This can be exploited by using the selected subset of active configurations $T_{active}$ that is already available, but recompute the time fractions $\alpha_t$ for each superframe. The optimization problem to be solved is limited to the number of active configurations and for each superframe $$\min_{\alpha_t \in T_{active}} \sum_{i=1}^{L} p_i \text{ s.t. } R_i \geq R_{act\,i} \forall\, i = 1 \ldots L \tag{3.12}$$

must be solved.

Figure 4:
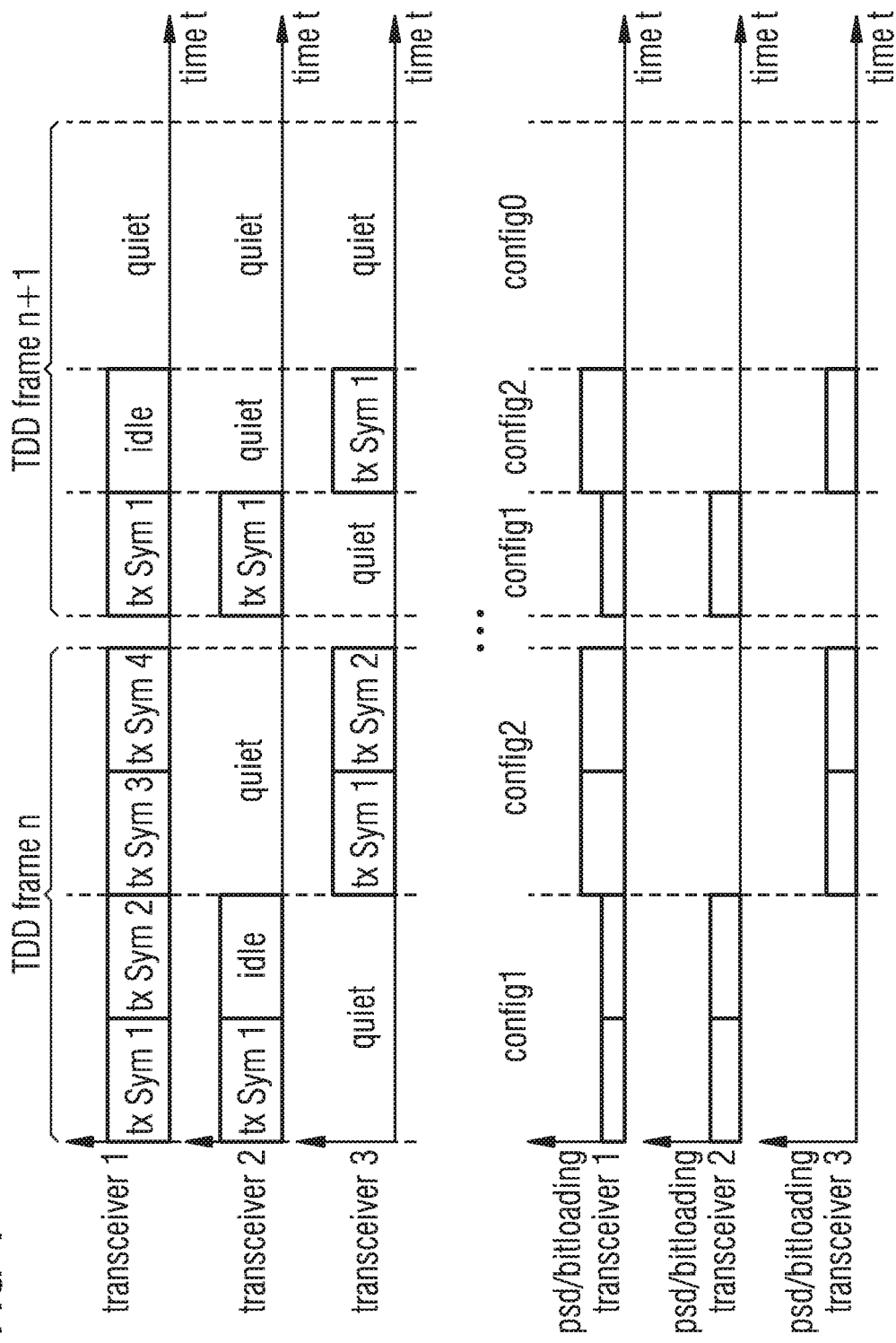
FIG. 4 illustrates an example for twotime division duplexing frames with discontinuous operation in a quasi static mode, according to an embodiment.

This operation mode is shown in FIG. 4.

With this approach, the selection the active configuration subset is only computed once when a line joins or leaves the system. The spectrum optimization which will be explained further below which requires high compute resources is also solved during line joining or leaving for the selected active configurations.

The scheduling problem in Eq. (3.12) is solved per TDD frame with respect to the actual rate requirements. Furthermore, the per-TDD-frame optimization problem has a limited number of dimensions and can therefore be solved easier.

There is not always a configuration where all configured data rates match the actual data rates, because of the limited subset of configurations $T_{active}$. In this case, some of the lines operate at a data rate higher than the actual rate requirements and idle symbols are used to fill the additional data rate. They may also be transmitted with zero power, as shown in Sec. 3.3.1. The schedule for the next TDD frame is communicated from the DP to the CPEs in advance.

The power saving capabilities of quasi-dynamic operation can be improved by a fully dynamic operation.

Figure 5:
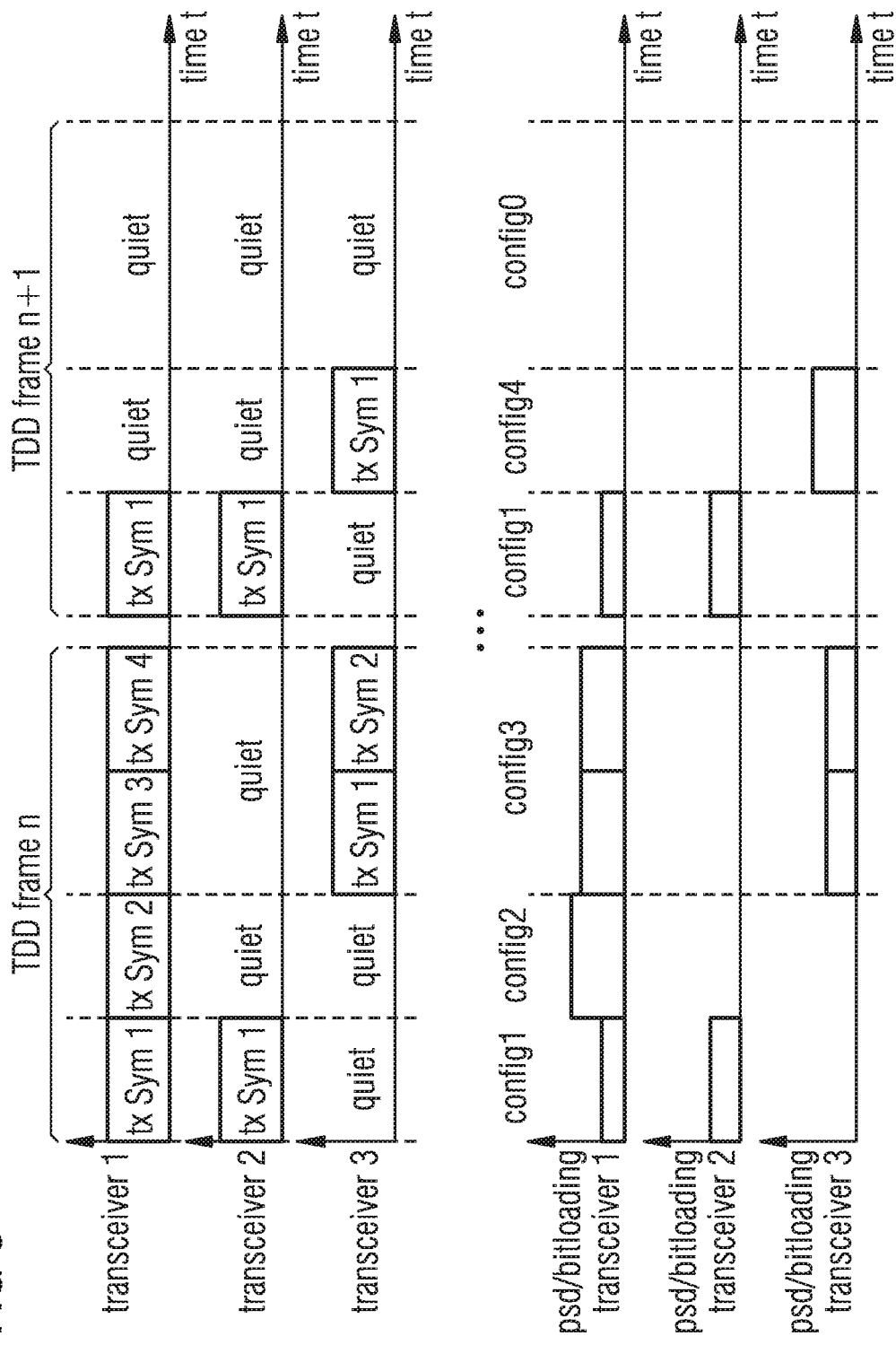
FIG. 5 shows an example for twotime division duplexing frames with discontinuous operation in a dynamic mode.

Another implementation will be referred to as dynamic operation. For dynamic operation, the subset of active configurations can also be changed for each superframe. This means that $$\min_{\alpha_t \in 1 \ldots T} \sum_{i=1}^{L} p_i \text{ s.t. } R_i \geq R_{act\,i} \forall\, i = 1 \ldots L \tag{3.13}$$

is solved for each TDD frame. The set of active configurations may change between the TDD frames, as shown in FIG. 5.

This may require computation of additional bit loading and gain tables which requires additional computational resources. and creates some management overhead because the reconfiguration may require exchanging bit loading and gain tables between DP and CPE.

This operation mode may achieve highest peak rates and best power saving capabilities. However, the communication overhead and the computational complexity is comparatively high.

A system which is able to handle different configurations of bit loading and gain tables may not only achieve higher data rates. The fact that the data rates of individual configurations are higher translates into additional power saving for given data rates.

Figure 6:
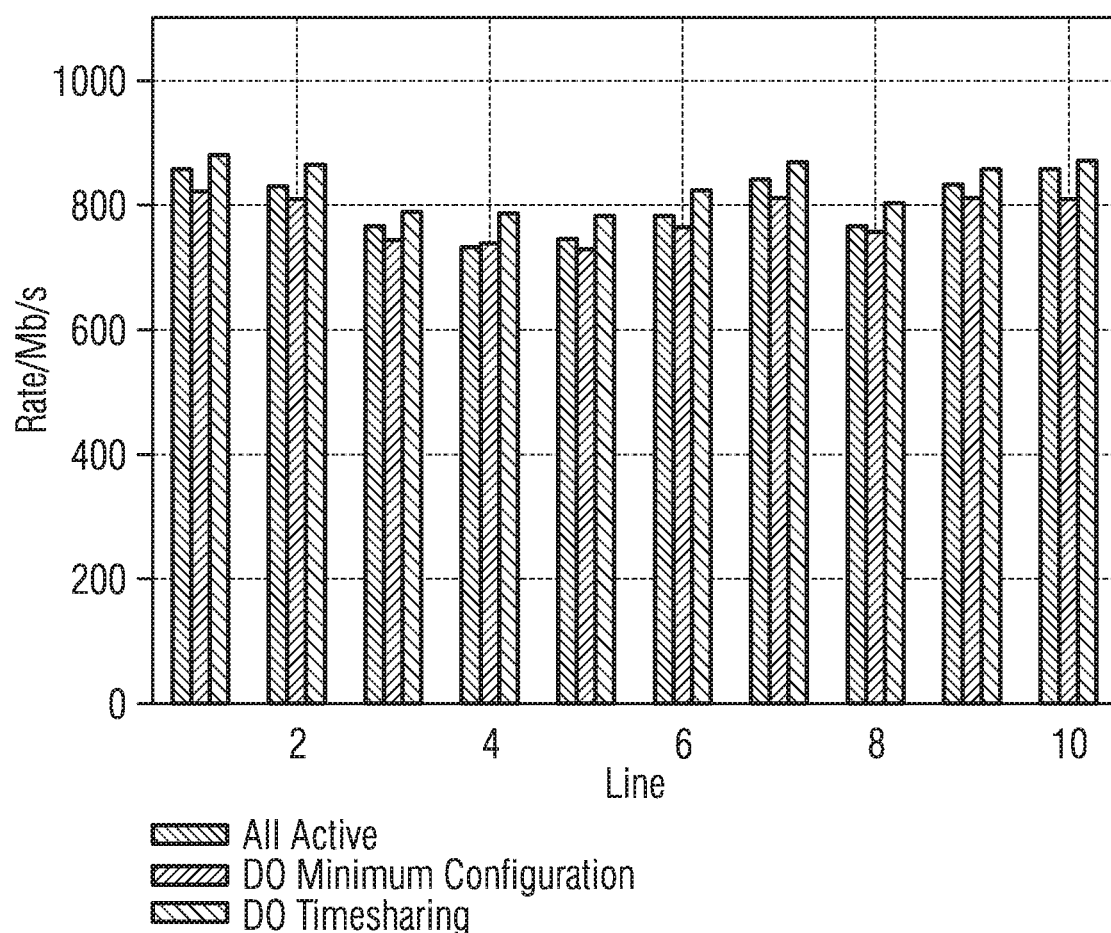
FIG. 6 illustrates a comparison between data rates without discontinuous operation and peak rates in quasi static operation.

In some of the configurations, the actual data rate is higher than the data rate a link when all lines are active. Therefore, it is possible to operate links temporarily at higher rates than the guaranteed rates, as shown in FIG. 6.

To demonstrate the concepts explained above, a cable binder with 10 lines of 100 mlength is evaluated. The target rates are set to 800 Mbit/s for lines 1 to 2, 100 Mbit/s for lines 3 to 6 and 500 Mbit/s for lines 7 to 10. Tab. 3.1 summarizes the simulation conditions of a wireline communication system where the discontinuous operation is applied.

TABLE 3.1

Parameters of simulation example

| Parameter | Value |
| --- | --- |
| Lines in binder | 10 |
| Binder length | 100 m |
| Cable type | BT cable |
| Direction | downlink |
| Transmit PSD | −76 dBm/Hz flat |
| Noise PSD | −140 dBm/Hz flat |
| Spectrum | 2 MHz-106 MHz |
| Transmit power | 4 dBm |

Figure 7:
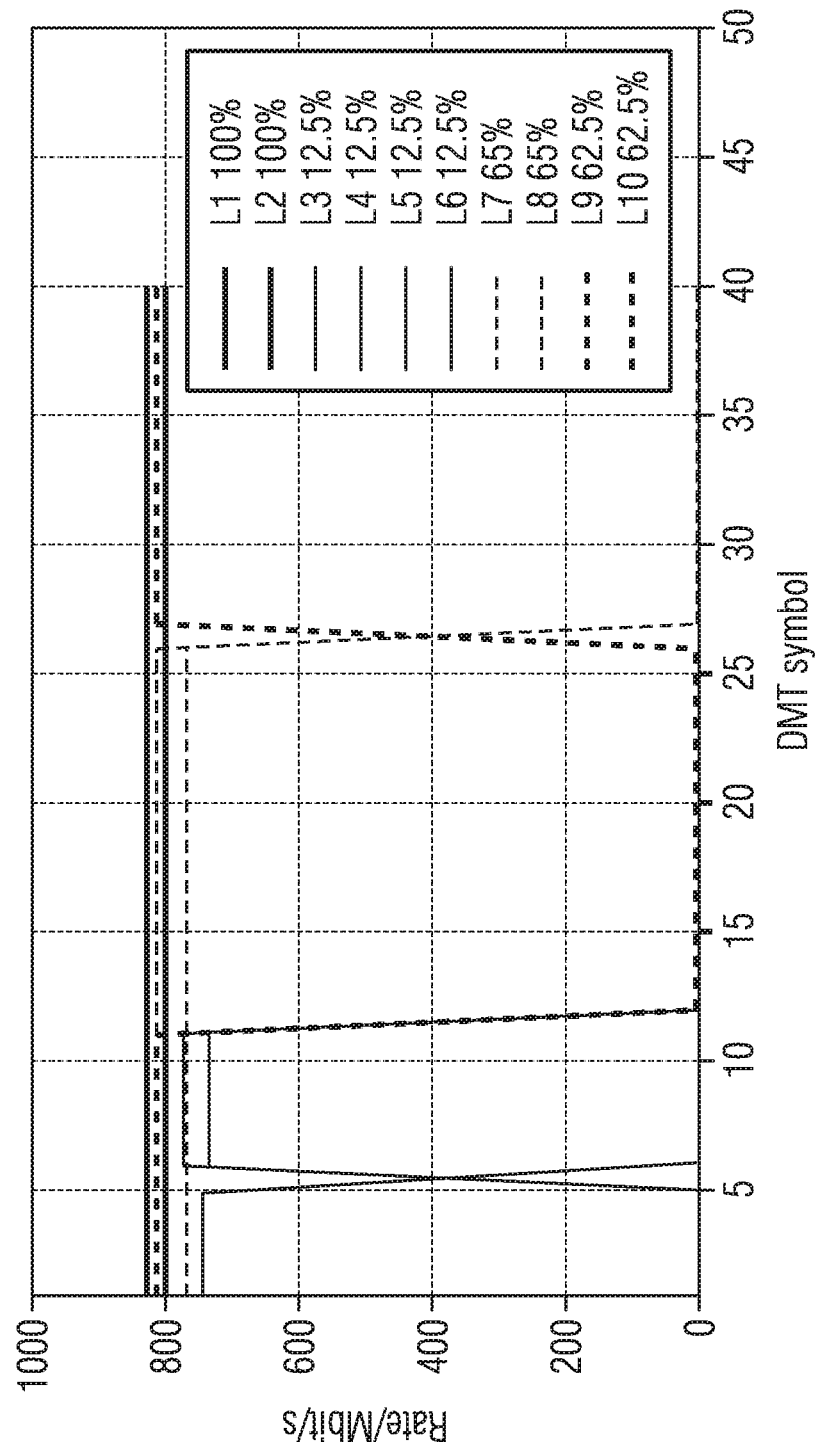
FIG. 7 is a diagram illustrating an assignment of data rates within a time division duplexing frame for a minimum configuration, an overall on time being 51%.

FIG. 7 shows the scheduling for a TDD frame with 40 DMT symbols. The average on-time of the links to achieve this data rates is 51%. Two lines reach their limit rate already. The data rates of the links are constant over the frame, because in transparent mode, the same bit loading is used for all symbols.

Figure 8:
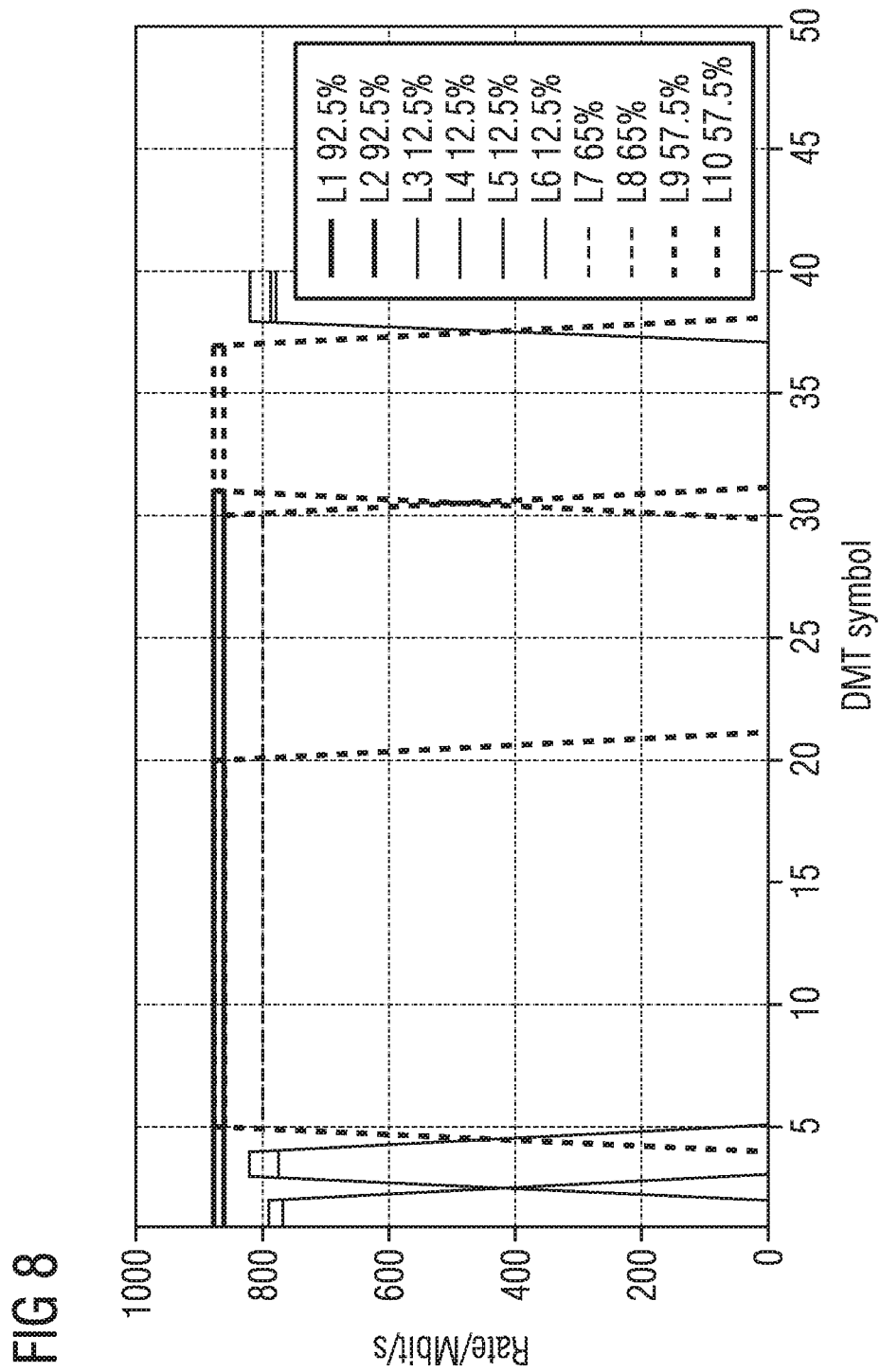
FIG. 8 shows an example assignment of data rates within a time division duplexing frame for timesharing, where an overall on time is 48%.

FIG. 8 shows the same system with the same target data rates using timesharing as discussed above. The average on-time is reduced from 51% to 48% by using timesharing. The data rates with timesharing depend on the set of active lines and are therefore changing over the TDD frame.

The above-discussed simulations and specific values of parameters are not to be construed as limiting and may vary in other implementations, but serve merely to illustrate operation of some embodiments further and improve understanding of some of the concepts discussed herein.

The proposed concepts for discontinuous operation allows improvements in the initialization. The line joining or system activation procedure contains multiple steps. Various standards describe conventional initialization procedures in detail. Line joining in particular refers to a case where an additional communication line (like communication connections 17-19 of FIG. 1) becomes active and for example has to be added to the vectoring to effect crosstalk compensation also with respect to such a joining line.

Figure 9:
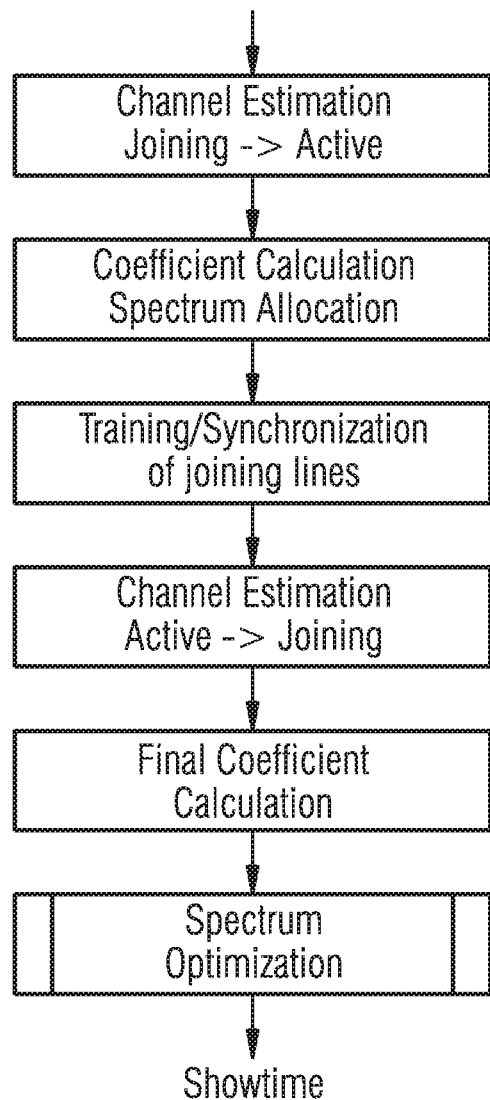
FIG. 9 illustrates a method for line joining.

Such procedures may contain many steps for channel estimation, synchronization and similar tasks. For discontinuous operation, the interesting step is transmit spectrum optimization before showtime, as shown in FIG. 9.

In contrast to the discontinuous operation implementation using the minimum configuration, discontinuous operation using timesharing as explained above in embodiments does not require to stop discontinuous operation during line joining.

Line joining in timesharing operation effectively means that one or more configurations including the joining lines are added, while the configurations which do not include any of the joining lines do not change.

The matrix of expected data rates for different configurations, as shown in Eq. (3.10) can be kept in memory for future initialization processes.

Figure 10:
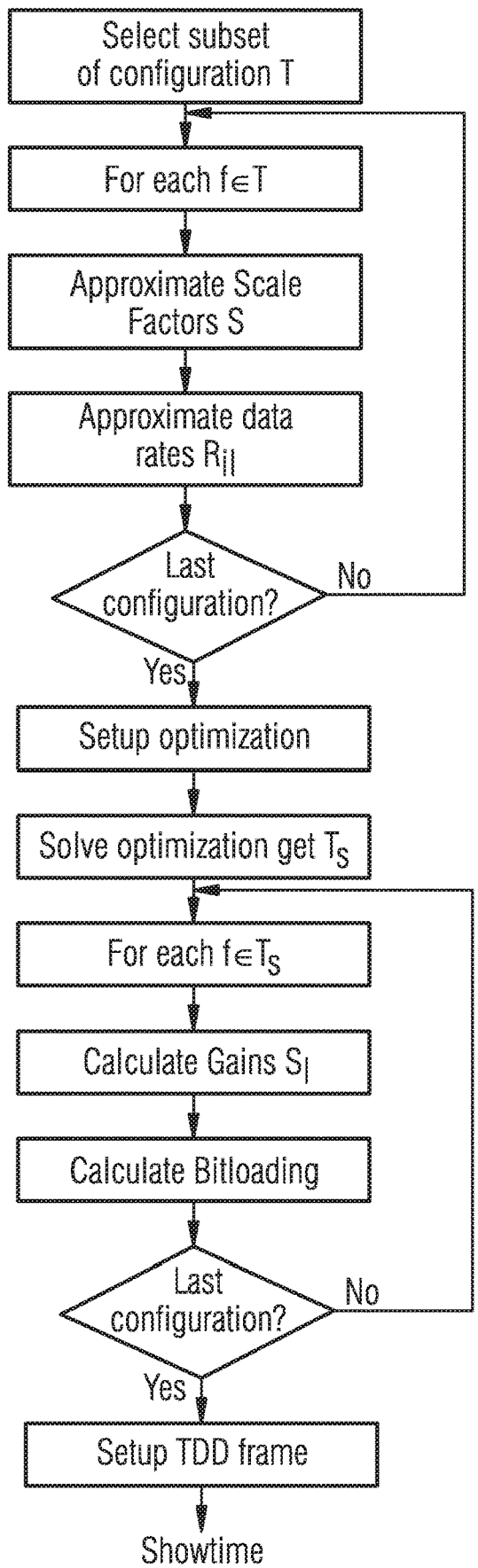
FIG. 10 illustrates a method for line joining according to an embodiment.

The data rates for additional configurations which include the joining line are estimated or approximated and added to the scheduler optimization setup, as shown in FIG. 10 illustrating a method of an embodiment. One method to approximate of rates and scale factors is to use a subset of the subcarriers to optimize PSDs (power spectral densities) and predict the data rates by interpolation between the subcarriers.

For the set of subcarriers contained in the active configuration set $T_a$, the additional scale factors, bit loading and other parameter required to setup data transmission are calculated.

Timesharing as described above may require communication between DP and CPE. This section describes additional communication according to embodiments which may be used to implement timesharing discontinuous operation on a wireline communication system (e.g. as shown in FIG. 1).

While most of the computations for the low power mode are performed only at times when the set of active lines changes, the rate adaptive low power modes as described above may require some computations to be done per TDD frame.

Furthermore, within the TDD frame, the coefficient recalculation as described further below is performed.

The CPE side stores multiple bit loading and gains tables for the set of active configurations $T_a \in T$. For each TDD frame, a medium access plan is communicated to the CPEs which informs them about the points in time where they are allowed to transmit data and points in time where they receive data.

Furthermore, it contains information which bit loading and gains table shall be used. With in one superframe, or even within the TDD frame, the transmission on one line may use different bit loading and gains tables. Each configuration may have an identification number which is also contained in the MAP to identify the configurations to be used.

It must be noted that the CPE stores bit loading and gains tables only for a small part of all configurations $T_a$, because the set of configurations includes some configurations where this specific CPE does not transmit or receive data which do not require storage of bit loading and gains tables at the CPE.

Furthermore, in embodiments online reconfiguration may be used. Each online reconfiguration message contains bit loading and gains table for the subcarriers to be changed. For timesharing, an identifier of the configuration to be changed is added.

Reconfiguration can be requested from the CPE side if the downstream SNR of one of the configurations has changed. It may also be initiated from the DP if the upstream SNR of one of the configurations has changed. If a change of the PSDs of multiple lines is required because of changes in the channel, the precoder coefficients or the SNR of some lines, the online reconfiguration of the downstream may also be initiated by the DP.

During line joining, but also during showtime when the rate requirements change, it might be required to change the set of active configurations $T_a$, corresponding to a configuration replacement. Therefore, an additional reconfiguration method is required which replaces one of the configurations.

It contains the identifier of the configuration to be replaced or added and the bit loading and gains tables of the active subcarriers.

For timesharing, an important information may be the link quality of a base configuration where all lines are active. However, if the system experiences residual crosstalk caused by imperfections in the crosstalk cancellation, the prediction of SNR of other configurations may be different to the actual SNR of the configurations.

Therefore, in embodiments, the DP is able to request SNR of a specific configuration from the CPE.

In some embodiments, coefficient recalculation for vectoring having reduced complexity may be used. Crosstalk cancellation and other MIMO (Multiple Input Multiple Output) signal processing methods are an important feature to improve performance of multi-user data transmission. Vectoring e.g. as defined in standards is successfully used to improve VDSL2 performance and for future wireline communication standards such as G.fast, crosstalk cancellation is mandatory.

Therefore, in embodiments, the low-power modes discussed above shall be compliant with systems using MIMO signal processing. This section discusses how to implement discontinuous operation in combination with linear MIMO precoding and equalization which has been proposed for FTTdp applications.

Some solutions propose approximations for coefficient recalculation to reduce the computational cost. However, approximations result cause some performance degradation compared to the exact solution.

With a system using the minimum configuration, the performance degradation on some configurations will result in a persistent performance degradation regardless of the actual configuration. This in embodiments can be avoided by timesharing.

Figure 11:
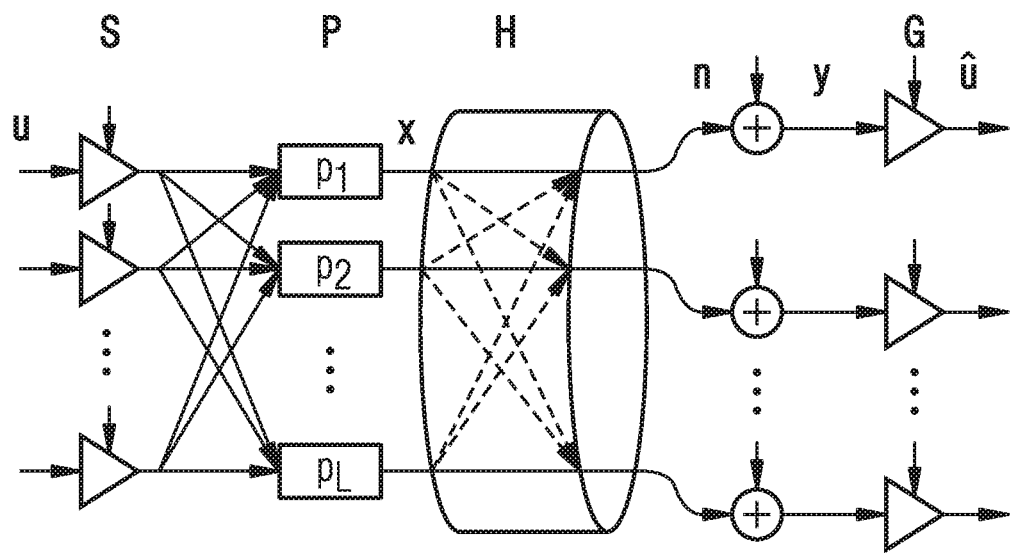
FIG. 11 illustrates a downstream system model with a linear precoder.

Linear vector precoding has been implemented on VDSL 2 systems to improve performance for wireline data transmission over crosstalk channels. The main drawback of conventional vectoring DSL systems is the static operation which requires very time-consuming joining and leaving procedures to enable or disable data transmission on a line of the binder. FIG. 11 shows a downstream system model with a linear precoder, which may be described by a precoder matrix P.

u is a vector essentially representing the data to be transmitted, each component of the vector corresponding to one of the channels. S is a matrix indicating for example amplification or gain. P as mentioned is a precoder matrix containing precoder coefficients for vectoring. H is a matrix describing the effects of the channels, including crosstalk between the channels. n represents additive noise. x represents the signals actually transmitted from the transmitter, and y represents a gain at a receiver side. û represents the symbols or data then received.

Coefficient recalculation may be given by $$P'_{aa} = P_{aa} - P_{ad} \cdot P_{dd}^{-1} \cdot P_{da} \quad (1.1)$$

according to the matrix inversion lemma.

Alternatively, the transmit signal x can be recomputed according to $$x_a = P_{ad} u_a - P_{ad} \cdot P_{dd}^{-1} \cdot P_{da} \cdot u_a \quad (1.2)$$

This requires inversion of the matrix $P_{dd}$ which is high computational effort if many lines have to be disabled and requires memory for the matrix inverse. To overcome both issues, an approximation of the matrix inversion can be used. First order taylor series expansion of the matrix inversion $P_{dd}^{-1} \approx 2I - P_{dd}$ gives an approximation of matrix inversion. Under the assumption that the diagonal elements of the precoder matrix are equal to 1, this leads to $$[P_{dd}^{-1}]_{ij} \approx \begin{cases} -p_{ddij} & \text{for } i \neq j \\ p_{ddij} & \text{for } i = j \end{cases} \quad (1.3)$$

where the original coefficient values can be kept and only the sign changes, which can be incorporated into the calculation.

In upstream direction, linear vector equalization is used instead of linear precoding.

Figure 12:
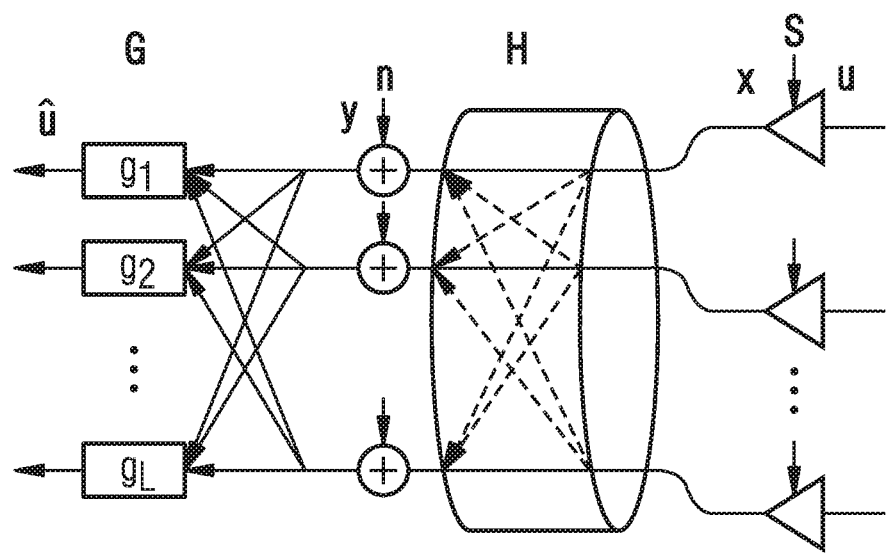
FIG. 12 illustrates an upstream system model with a linear equalizer.

The system model is shown in FIG. 12 which corresponds to $$\hat{u} = G \cdot H \cdot S \cdot u \quad (1.4)$$

G being the matrix containing the equalization coefficients. Similar to the downstream case, coefficient recalculation can be done by $$G'_{aa} = G_{aa} - G_{ad} \cdot G_{dd}^{-1} \cdot G_{da} \quad (1.5)$$

Apart from G, the matrices and vectors of (1.4) correspond to the ones explained above.

Alternatively, the recalculation based on the receive signal according to $$\hat{u}_a = G_{aa} y_a - G_{da} \cdot G_{dd}^{-1} \cdot G_{ad} y_a \quad (1.6)$$

can be implemented.

The approximation by first order taylor series expansion can't be used in upstream, as the precoder is not close to the identity matrix. But the equalizer can be divided into two parts $G = G_{feq} \cdot G_{xt}$, a diagonal equalizer $G_{feq}$ and a off-diagonal equalizer $G_{xt}$, which is close to the identity matrix. The off-diagonal equalizer has diagonal elements equal to one so that the method does not increase complexity $G_{xt} = \text{diag}(H^{-1})^{-1} \cdot H^{-1}$. The diagonal equalizer corresponds to the frequency domain equalizer as it is used in downstream direction $G_{feq} = \text{diag}(G_{xt} \cdot H)^-$.

Eq. (1.7) is only applied to the off-diagonal equalizer.

$$G'_{xt\,aa} = G_{xt\,aa} - G_{xt\,ad} \cdot G_{xt\,dd}^{-1} \cdot G_{xt\,da} \quad (1.7)$$

where the approximation $$[G_{xtdd}^{-1}]_{ij} \approx \begin{cases} -g_{xtddij} & \text{for } i \neq j \\ g_{xtddij} & \text{for } i = j \end{cases} \quad (1.8)$$

can be used for $$G_{xt\,dd}^{-1}.$$

For the recalculation based on transmit signals, $$\hat{u}_a = G_{feq\,aa} G_{xt\,aa} y_a - G_{xt\,da} \cdot G_{xt\,dd}^{-1} \cdot G_{xt\,ad} y_a \quad (1.9)$$

is used.

Next, embodiments for transmit spectrum shaping will be discussed.

Transmit power in wireline communication is limited by regulation and for technical reasons. To satisfy regulatory constraints and to use the available transmit power as efficient as possible, transmit spectrum shaping is used.

The output spectrum of the linear precoder as well as the nonlinear precoder is different to the input spectrum. To keep the crosstalk cancellation capabilities while changing the transmit spectrum, the transmit spectrum is shaped at the precoder input with the scale matrix S as shown in FIG. 11. The transit covariance matrix $C_{tx}$ is then given by $$C_{tx} = PSS^H P^H, \quad (1.10)$$

where the diagonal elements correspond to the transmit power of the individual ports. In wireline communication, the per-line transmit spectrum is constrained by a spectral mask which is equivalent to a maximum transmit power $p_{max}$ $$c_{tx\,ii} \leq p_{max} \qquad (1.11)$$

which in general depends on frequency. This section shows two spectrum shaping approaches for wireline communication with linear precoding in downlink direction.

A simple approach for transmit spectrum scaling is to select the scale factors with respect to the line with the highest gain. Then, the scale factors are given by $$s_{ii} = \sqrt{\frac{p_{max}}{\text{maxdiag}(PP^H)}} . \qquad (1.12)$$

This spectrum scaling method guarantees that the output spectrum complies with the spectral mask on all lines, but only one line will be close to the maximum, while the other lines are scaled lower than that. In general, there is no input transmit spectrum such that all lines can transmit with maximum power. But it is possible to calculate an input spectrum such that the data rates are maximized as shown in the next section.

To improve performance, spectrum optimization can be applied. The data rate $R_l$ of link l for linear zero forcing precoding is given by $$R_l = \log_2\left(1 + \frac{[H^{-1}]_{ll}^{-1} \cdot |s_l|^2}{\Gamma \sigma_{noise}^2}\right) \qquad (1.13)$$

It depends on the channel matrix H, the scale factors S and on the noise variance $\sigma_{noise}^2$.

Equation (1.13) assumes that the SNR is given by $$SNR_l = +\frac{[H^{-1}]_{ll}^{-1} \cdot |s_l|^{2^2}}{\sigma_{noise}} \qquad (1.14)$$

as a function of the channel matrix H, the receiver noise power $\sigma_{noise}^2$ and the scale matrix S. This holds for a linear zero forcing precoder, where the transmit signal $u_l$ of line l before gain scaling has unit power. Furthermore, the precoder matrix P is scaled such that the diagonal elements are equal to 1, according to $$P = H^{-1} \cdot \text{diag}(H^{-1})^{-1} \qquad (1.15)$$

The optimization is done with an objective function for all lines, which is here the sum data rate. An additional constraint is introduced to take the limited modulation alphabet into account. There is an upper bound $b_{max}$ and a lower bound $b_{min}$, usually $b_{min}=1$ for the bit loading b per tone and line. This translates in a maximum required SNR $$SNR_{max} = 2^{b_{max}} - 1 \qquad (1.16)$$

and a minimum SNR $$SNR_{min} = 2^{b_{min}} - 1 \qquad (1.17)$$

The maximum bit loading and the limit PSD is reformulated in a linear constraint set of the form $A \cdot x = b$. Instead of maximizing with respect to the gain values $s_i$, the squared gain values $|s_i|^2$ are used as arguments for the optimization problem $$\max_{|s_1|^2 \ldots |s_L|^2} \sum_{l=1}^{L} R_l \text{ s.t.} \begin{array}{l} \sum_{i=1}^{L} |p_{li}|^2 |s_i|^2 \leq p_{max} \forall l = 1 \ldots L \\ |s_l|^2 \geq 0 \forall l = 1 \ldots L \\ \frac{|[H^{-1}]_{ll}^{-1}|^2 \cdot |s_l|^2}{\sigma_{noise}^2} \leq 2^{b_{max}} - 1 \forall l = 1 \ldots L \end{array} \qquad (1.18)$$

The arguments which solve this optimization problem are the sum-rate optimal scale factors.

The term "quiet mode" referring to a line as used herein may refer to a deactivated line, a line in no-power mode, a line transmitting quiet symbols, a line transmitting idle symbols with no transmit power and the like.

The above-discussed embodiments serve merely as examples, and are not to be construed as limiting. Not all the features or details discussed above may be implemented in embodiments. Instead, in some embodiments, only some of the features or details, and/or alternative features or details, may be discussed.

What is claimed is:

1. A device arranged to transmit data in a discontinuous operation network, the device comprising provider equipment configured to:
   transmit, via the provider equipment, data onto lines in the discontinuous operation network that transmits data during normal operation and transmits quiet or idle symbols on some lines during discontinuous operation;
   dynamically set, via the provider equipment, a transmission timing of the data to be transmitted, based on a change of a data rate requirement of at least some of the lines during communication, by setting the transmission timing during communication; and
   set, via the provider equipment, the transmission timing by initiating an online reconfiguration procedure for an adaptation during communication with an online reconfiguration message,
   wherein the device is configured to set the transmission timing based on a set of configurations of the lines, a data rate per link, a power of each line, a power limit, and a total number of lines.

2. The device of claim 1, wherein the device is configured to set the transmission timing of a Time Division Duplexing (TDD) frame.

3. The device of claim 1, wherein the device is configured to set the transmission timing based on active configurations of the lines.

4. The device of claim 1, wherein the device is configured to quasi dynamically set the transmission timing.

5. The device of claim 1, wherein the device is configured to set the transmission timing to achieve a predetermined power consumption for a set of specific disabled and enabled lines.

6. The device of claim 1, wherein the device is configured to use precoder coefficients of a disabled line to estimate an effect on crosstalk without the disabled line.

7. The device of claim 1, wherein the device is configured to modify bits or gains during discontinuous operation based on which lines are transmitting and which are not.

8. The device of claim 1, wherein the device is configured to set the transmission timing based on a line joining the discontinuous network.

9. The device of claim 1, wherein the device is configured to transmit the quiet symbols during discontinuous operation with zero power.

10. A device arranged to transmit data in a discontinuous operation network, the device comprising premises equipment configured to:

transmit data, via the premises equipment, onto a line amongst a plurality of lines in the discontinuous operation network, wherein that the data is transmitted during normal operation and transmits quiet or idle symbols on the line during discontinuous operation;

dynamically receive, via the premises equipment, a transmission timing of the data to be transmitted, based on a change of a data rate requirement of the line during showtime;

transmit, via the premises equipment, the data with the transmission timing of the data; and transmit, via the premises equipment, the data with the transmission timing in accordance with an online reconfiguration procedure to set the transmission timing during showtime for an adaptation with an online reconfiguration message, wherein the transmission timing is determined based on a set of configurations of the lines, a data rate per link, a power of each line, a power limit, and a total number of lines.

11. The device of claim 10, wherein the device is configured to transmit the data with the transmission timing of the data of a Time Division Duplexing (TDD) frame.

12. The device of claim 10, wherein the device is configured to set the transmission timing based on active configurations of the lines.

13. The device of claim 10, wherein the device is configured to transmit the quiet symbols during discontinuous operation with zero power.

14. A method to transmit data in a discontinuous operation network via a provider equipment, the method comprising:

transmitting data onto lines in the discontinuous operation network that transmits data during normal operation and transmits quiet or idle symbols on some lines during discontinuous operation;

dynamically setting a transmission timing of the data to be transmitted, based on a change of a data rate requirement of at least some of the lines during showtime, by setting the transmission timing during showtime; and initiating an online reconfiguration procedure to set the transmission timing during showtime for an adaptation with an online reconfiguration message, wherein the transmission timing is set based on a set of configurations of the lines, a data rate per link, a power of each line, a power limit, and a total number of lines.

15. The method of claim 14, wherein the step of setting the transmission timing sets the transmission timing of a Time Division Duplexing (TDD) frame.

16. The method of claim 14, wherein the step of setting the transmission timing sets the transmission timing based on active configurations of the lines.

17. The method of claim 14, wherein the step of setting the transmission timing sets the transmission timing quasi dynamically.

18. The method of claim 14, wherein the step of setting the transmission timing sets the transmission timing by setting a fraction of a transmission time at of the data according to the following equation:

$$\max_{a_t, t \in 1 \ldots T} \sum_{i=1}^{L} R_i \text{ s.t. } \sum_{i=1}^{L} p_{linei} \leq p_{limit}.$$

wherein, T is a set of configurations of the lines, R is the data rate per link i, and Plinei is the power of the $i^{th}$ line, plimit is the maximum power limit, and L is the total number of lines.

19. The method of claim 14, wherein the step of setting the transmission timing sets the transmission timing to achieve a minimum power consumption for a set of specific disabled and enabled lines.

20. The method of claim 14, wherein the method further comprises the step of estimating an effect on crosstalk using precoder coefficients of a disabled line.

21. The method of claim 14, wherein the method further comprises the step of modifying bits or gains during discontinuous operation based on which lines are transmitting and which are not.

22. The method of claim 14, wherein the step of setting the transmission timing sets the transmission timing on a line joining the discontinuous network.

23. The method of claim 14, wherein the method further comprises the step of transmitting the quiet or idle symbols during discontinuous operation with zero power.

* * * * *